(12) United States Patent
Subrahmanyam

(10) Patent No.: US 12,464,678 B2
(45) Date of Patent: Nov. 4, 2025

(54) SELF-HEALING, TARGET TEMPERATURE LOAD BALANCING, AND RELATED TECHNOLOGIES FOR HEAT EXCHANGER NETWORKS

(71) Applicant: Intel Corporation, Santa Clara, CA (US)

(72) Inventor: Prabhakar Subrahmanyam, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 910 days.

(21) Appl. No.: 17/342,481

(22) Filed: Jun. 8, 2021

(65) Prior Publication Data

US 2021/0307199 A1 Sep. 30, 2021

(51) Int. Cl.
*H05K 7/20* (2006.01)
*G06F 1/20* (2006.01)

(52) U.S. Cl.
CPC ......... *H05K 7/20281* (2013.01); *G06F 1/206* (2013.01); *H05K 7/20272* (2013.01); *G06F 2200/201* (2013.01); *H05K 7/20218* (2013.01)

(58) Field of Classification Search
CPC .......... H05K 7/20218–20281; H05K 7/20272; G06F 1/206; G06F 2200/201

USPC ......................................................... 165/288
See application file for complete search history.

(56) References Cited

U.S. PATENT DOCUMENTS

| 2012/0118534 A1* | 5/2012 | Goth ................. H05K 7/20781 165/104.33 |
| 2013/0178999 A1* | 7/2013 | Geissler ............... G06F 9/5094 700/299 |
| 2017/0177007 A1* | 6/2017 | Shelnutt ............ H05K 7/20736 |
| 2018/0213685 A1* | 7/2018 | Chainer ............ H05K 7/20772 |
| 2021/0120703 A1 | 4/2021 | Subrahmanyam et al. |

* cited by examiner

*Primary Examiner* — Joel M Attey
(74) *Attorney, Agent, or Firm* — Alliance IP, LLC

(57) ABSTRACT

Techniques for heat exchanger networks are disclosed. In the illustrative embodiment, several heat exchangers and several components to be cooled are connected together in a network. The flow of liquid coolant to each component and heat exchanger can be individually controlled. If a particular component needs more or less cooling, the flow rate of coolant through that component can be controlled. If a first component needs more cooling and a second component can operate with less cooling, coolant may be rerouted from the first component to the second component. Thus, target temperature load balancing can be achieved for all the components of the system. If a heat exchanger is faulty, it can be isolated, and a backup heat exchanger can be brought online, making the system self-healing and fault-tolerant. The faulty heat exchanger can then be repaired or replaced while the rest of the system is operational.

22 Claims, 10 Drawing Sheets

SELF-HEALING, TARGET TEMPERATURE LOAD BALANCING, AND RELATED TECHNOLOGIES FOR HEAT EXCHANGER NETWORKS

BACKGROUND

Components such as processors dissipate large amounts of heat, which must be removed to prevent the components from overheating. Air cooling by passing air through fins of a heat sink coupled to the component can provide cooling, but air cooling is limited by the relatively low heat capacity of air. Liquid cooling can take advantage of the large heat capacity of water and other liquids relative to air.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Liquid cooling can move large amounts of heat from components in computing devices such as processors. In some cases, a heat exchanger may be used to remove heat from a liquid coolant and transfer it to another medium, such as air or another liquid. However, if a particular component of a compute system requires more cooling than a single heat exchanger can provide, the component may have its performance limited. Additionally, if the heat exchanger becomes damaged or inefficient in some manner, then the cooling provided by the heat exchanger may be limited, which may, in turn, limit the performance of the component being cooled.

Figure 1:
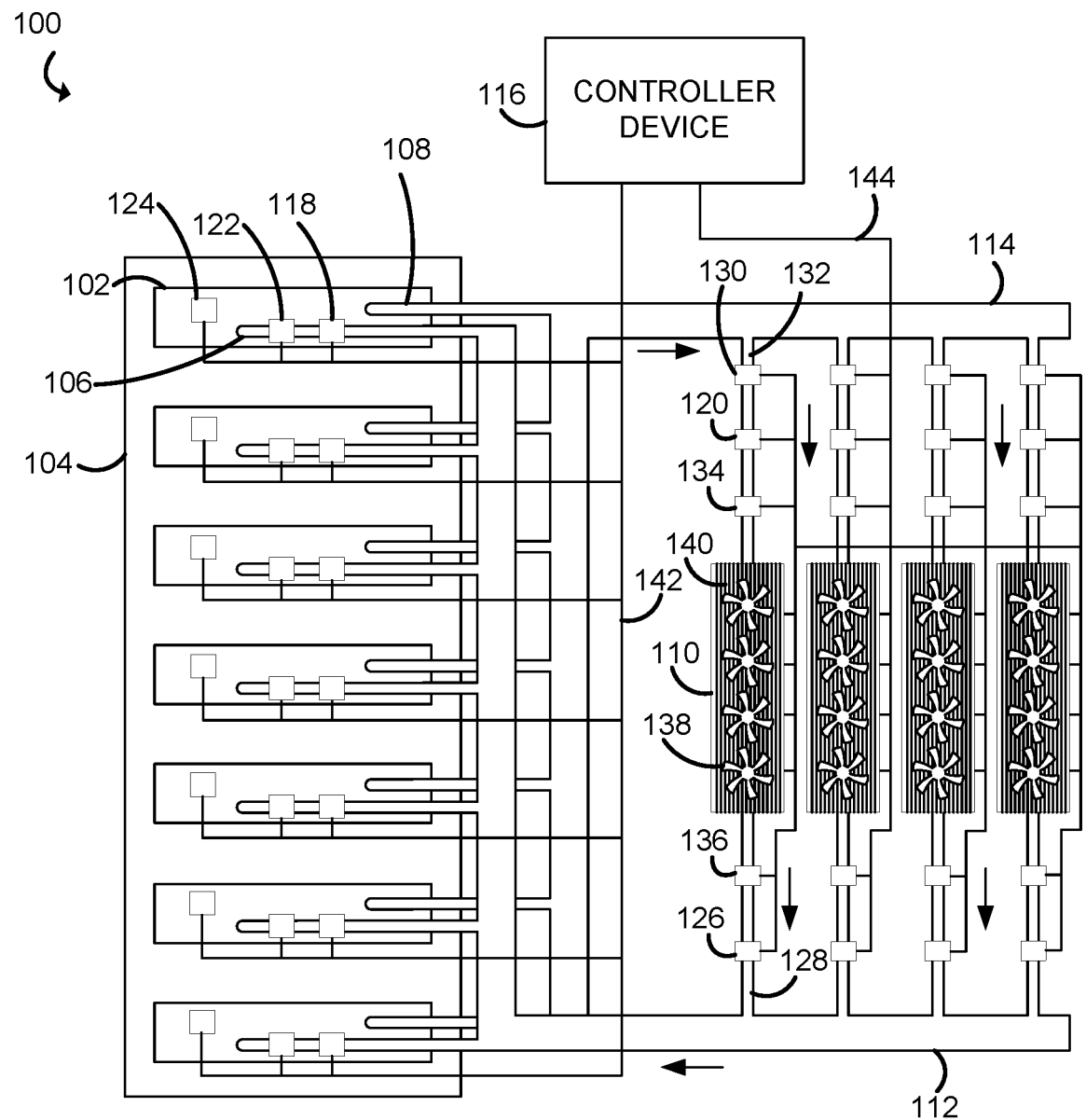
FIG. 1 is a simplified block diagram of a system for liquid cooling components of a compute system with a network of heat exchangers.

Referring now to FIG. 1, in one embodiment, a system 100 includes one or more compute devices 102, which may be compute devices 102 in a rack 104. Each compute device 102 is connected to one or more inlet tubes 106 and one or more outlet tubes 108. The inlet tubes 106 and outlet tubes 108 are connected to several heat exchangers 110 through an inlet manifold 112 and an outlet manifold 114, respectively.

A controller device 116 controls component valves 118 connected to each inlet tube 106 that provides coolant to one or more components of the compute devices 102. The controller device 116 also controls heat exchanger valves 120 connected to each heat exchanger 110.

In use, in the illustrative embodiment, the controller device 116 controls coolant flowing through the heat exchangers 110 by controlling the heat exchanger valves 120 and controls coolant flowing into each compute device 102 by controlling the component valves 118. The controller device 116 may monitor a temperature of the components being cooled as well as the temperature of the liquid coolant going into and out of each heat exchanger 110. The controller device 116 may adjust the coolant going to each component based on the temperature of the component as well as the temperature of another component. For example, if a first component is operating below a maximum temperature and a second component is operating at or above a maximum temperature, the controller device 116 may decrease the coolant flow to the first component and increase the coolant flow to the second component.

Additionally or alternatively, in the illustrative embodiment, the controller device 116 may monitor and manage the heat exchangers 110. For example, if the controller device 116 determines that a heat exchanger 110 is not operating correctly, such as by determining that the liquid coolant is approximately the same temperature going into the heat exchanger 110 as coming out of the heat exchanger 110 when it should be cooler coming out, the controller device 116 may close the heat exchanger valve 120 for that heat exchanger 110. To compensate for the loss of a heat exchanger 110, the controller device 116 may open a heat exchanger valve 120 for a backup (or standby) heat exchanger 110, resulting in no net loss of cooling power. In some embodiments, the backup heat exchanger 110 may be used during normal operation, either to increase cooling capacity or to provide an active reserve cooling supply, and the system 100 may not need to explicitly activate the backup heat exchanger 110 when a faulty heat exchanger 110 is taken offline.

In some embodiments, the controller can alert an administrator that a heat exchanger 110 is not operating properly. Because the heat exchanger valve 120 is closed, an administrator can hot-swap the faulty heat exchanger 110 while the system 100 (and other heat exchangers 110) continues to operate.

In the illustrative embodiment, each inlet tube 106 has a component valve 118 as well as a flow sensor 122 to monitor a flow rate of coolant through the inlet tube 106. Additionally, a temperature sensor 124 can monitor a temperature of a component of the compute device 102. Similarly, a flow sensor 126 monitors a flow rate of coolant through the outlet tube 128 of each heat exchanger 110. A pump 130 in the inlet tube 132 of each heat exchanger 110 pumps coolant through the heat exchanger 110. An inlet temperature sensor 134 senses a temperature of coolant going into the heat exchanger 110, and an outlet temperature sensor 136 senses a temperature of coolant going out of the heat exchanger 110.

The illustrative heat exchanger 110 includes one or more fans 138 and one or more sensors 140 in the heat exchanger 110. The sensors 140 may, e.g., detect temperature and/or flow rate of air exiting the heat exchanger 110 at one or more positions.

The illustrative controller device 116 is connected to the sensors and actuators associated with the compute devices 102 (e.g., the valve 118, the flow sensor 122, the temperature sensor 124, etc.) through a component bus 142 and is connected to the sensors and actuators of the heat exchangers 110 (e.g., the pump 130, the valve 120, the temperature sensor 134, the sensors 140, the fans 138, the temperature sensor 136, the flow sensor 126, etc.) through a heat exchanger bus 144.

The system 100 may include any suitable number of racks 104, such as 1-10,000 racks 104, each of which may include any suitable number of compute devices 102, such as 1-16 compute devices 102. The racks 104 may be located any suitable distance away from the heat exchanger 110, such as 5-100 meters. In some embodiments, each compute device 102 may have a single inlet tube 106. In other embodiments, some or all of the compute devices 102 may have more than one inlet tube 106 connected to different components of the compute device 102. For example, in one embodiment, a compute device 102 may have some or all of a central processing unit, a platform controller hub (PCH), an application-specific integrated circuit (ASIC), a graphics processing unit, a field programmable gate array (FPGA), etc. that are cooled by separate inlet tubes 106 with separate valves 118, allowing the coolant flow rate for each component to be controlled separately.

In the illustrative embodiment, the inlet tube 106, the outlet tube 108, the inlet tube 132, and the outlet tube 128 are made out of flexible polyvinyl chloride (PVC). In other embodiments, the tubes 106, 108, 128, 132 may be made of any suitable material, such as plastic, copper, or other metal, etc. In the illustrative embodiment, the tubes 106, 108, 128, 132 have an inner diameter of ¼ inches and an outer diameter of ⅜ inches. In other embodiments, the tubes 106, 108, 128, 132 may have any suitable inner diameter, such as ⅛ to 6 inches, and any suitable outer diameter such as 3/16 to 7 inches. In the illustrative embodiment, liquid coolant flows from an inlet tube 106 into the compute device 102, into one or more water blocks (or cold plates) of the compute device 102 that are thermally coupled to the components to be cooled, and into the outlet tube 108.

The illustrative heat exchanger 110 includes a radiator that has several fins thermally coupled to one or more tubes flowing through the heat exchanger. The fans 138 blow air across the fins, transferring heat from the liquid coolant to the fins to the air, cooling the liquid coolant. In other embodiments, the heat exchanger 110 may be embodied as, e.g., a chiller, a liquid-liquid heat exchanger, or any other suitable heat exchanger. The controller device 116 may be able to monitor and/or control the speed of the fans 138. It should be appreciated that, in the illustrative embodiment, liquid coolant flows from one end of the heat exchanger to the other, passing each fan 138 along the way. As such, the temperature of the air exhaust of each fan 138 should decrease an expected amount along the heat exchanger 110. If the temperature of the air exhaust is not decreasing as expected, a particular fan 138 may be faulty or may have its airflow blocked. The liquid coolant in the heat exchanger 110 may be cooled to any suitable temperature at, below, or above room temperature, such as 0-50° Celsius. Of course, for a heat exchanger 110 cooled by ambient air, the liquid coolant in the heat exchanger 110 cannot be cooled below the temperature of the ambient air. In the illustrative embodiment, the liquid coolant is water, such as deionized water. In other embodiments, other fluids may be used, such as alcohol, glycol, and/or any other suitable fluid or mix of fluids.

Each of the illustrative inlet manifold 112 and the outlet manifold 114 is connected to several components of the compute device 102 to be cooled and to several heat exchangers 110. In other embodiments, each of the inlet manifold 112 and the outlet manifold 114 may be connected to a single component to be cooled or to a single heat exchanger 110. Each of the inlet manifold 112 and the outlet manifold 114 may be any suitable size or shape suitable to carry the liquid coolant. Each of the inlet manifold 112 and the outlet manifold 114 may be any suitable material, such as aluminum, copper, steel, PVC, plastic, etc. Each of the inlet manifold 112 and the outlet manifold 114 may include a series of tubes, connectors, etc.

Each valve 118, 120 may be any suitable valve, such as a sliding stem valve or rotary valve. Each valve 118, 120 may use any suitable electromechanical means of control, such as a solenoid, a linear motor, a stepper motor, an angular motor, etc. Each of the illustrative valves 118, 120 may be partially opened, allowing for the flow through the valve 118, 120 to be fine-tuned, rather than simply turned off and on. Additional vales may be present in the system 100 that are not shown, such as one-way valves to prevent backflow or to prevent leaks when, e.g., a heat exchanger 110 is taken offline.

Each of the temperature sensors 124, 134, 136 may be any suitable temperature sensor, such as thermocouples, resistance temperature detectors, thermistors, and semiconductor-based sensors. In some embodiments, the temperature sensor 124 may be integrated into a component or case of a component to be cooled. Such a temperature sensor 124 may sense a junction temperature of a component to be cooled, which may be hotter than a case temperature.

The pump 130 may be any suitable pump, such as a centrifugal pump, an axial pump, a positive displacement pump, etc. In the illustrative embodiment, each pump 130 pumps about 1 cubic centimeter per second of coolant. In other embodiments, the pump 130 may pump any suitable volume, such as 0.1-50 cubic centime per second. In the illustrative embodiment, the pump 130 is in the inlet tube 132 for a heat exchanger 110. In other embodiments, the pump 130 may be in a different position, such as in the inlet manifold 112, in the outlet manifold 114, in the outlet tube 128 of a heat exchanger 110, etc. In the illustrative embodiment, the controller device 116 can set a pump flow rate for the pump 130.

Each of the buses 142, 144 may be embodied as any suitable bus, such as a bundle or wires, cables, chip traces, etc. In some embodiments, the controller device 116 may be connected to some or all of the sensors and/or actuators using a direct-wired connection, an indirect wired connection (such as through an intermediate compute device or network), and/or a wireless connection. In some embodiments, some or all of the various sensors and/or actuators may be controlled through a network, such as a network used to connect the compute devices 102 to each other.

Figure 2:
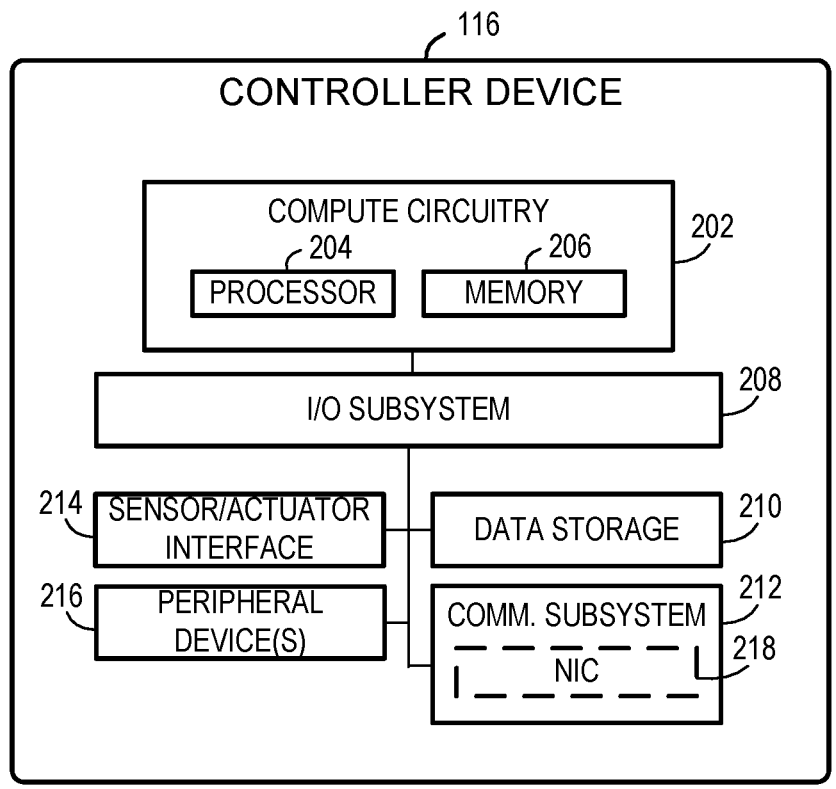
FIG. 2 is a simplified block diagram of at least one embodiment of a controller device of the system of FIG. 1.

Referring now to FIG. 2, aa controller device 116 includes a compute engine (also referred to herein as "compute circuitry") 202, an input/output (I/O) subsystem 208, data storage 210, a communication circuitry subsystem 212, a sensor/actuator interface 214, and, optionally, one or more peripheral devices 216. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The controller device 116 may be embodied as any type of engine, device, or collection of devices capable of performing various compute functions. In some examples, the controller device 116 may be embodied as a single device such as an integrated circuit, an embedded system, a field-programmable gate array (FPGA), a system-on-a-chip (SOC), or other integrated system or device. In some embodiments, the controller device 116 may be embodied as a compute device 102 in a rack 104. In the illustrative example, the controller device 116 includes or is embodied as a processor 204 and a memory 206. The processor 204 may be embodied as any type of processor capable of performing the functions described herein (e.g., executing an application). For example, the processor 204 may be embodied as a multi-core processor(s), a microcontroller, a processing unit, a specialized or special purpose processing unit, or other processor or processing/controlling circuit.

In some examples, the processor 204 may be embodied as, include, or be coupled to an FPGA, an application-specific integrated circuit (ASIC), reconfigurable hardware or hardware circuitry, or other specialized hardware to facilitate performance of the functions described herein. Also in some examples, the processor 204 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general-purpose processing hardware. However, it will be understood that a xPU, a SOC, a CPU, and other variations of the processor 204 may work in coordination with each other to execute many types of operations and instructions within and on behalf of the controller device 116.

The memory 206 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the memory 206 may be integrated into the processor 204. The memory 206 may store various software and data used during operation, such as one or more applications, data operated on by the application(s), libraries, and drivers.

The compute circuitry 202 is communicatively coupled to other components of the controller device 116 via the I/O subsystem 208, which may be embodied as circuitry and/or components to facilitate input/output operations with the compute circuitry 202 (e.g., with the processor 204 and/or the main memory 206) and other components of the compute circuitry 202. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 208 may form a portion of a system-on-a-chip (SoC) and be incorporated, along with one or more of the processor 204, the memory 206, and other components of the compute circuitry 202, into the compute circuitry 202.

The one or more illustrative data storage devices 210 may be embodied as any type of devices configured for short-term or long-term storage of data such as, for example, memory devices and circuits, memory cards, hard disk drives, solid-state drives, or other data storage devices. Individual data storage devices 210 may include a system partition that stores data and firmware code for the data storage device 210. Individual data storage devices 210 may also include one or more operating system partitions that store data files and executables for operating systems depending on, for example, the type of controller device 116.

The communication circuitry 212 may be embodied as any communication circuit, device, or collection thereof, capable of enabling communications over a network between the compute circuitry 202 and another compute device (e.g., an edge gateway of an implementing edge computing system, a base station, a cell tower, etc.). The communication circuitry 212 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LPWAN) or low-power wide-area (LPWA) protocols, etc.) to effect such communication.

The illustrative communication circuitry 212 includes a network interface controller (NIC) 218, which may also be referred to as a host fabric interface (HFI). The NIC 218 may be embodied as one or more add-in-boards, daughter cards, network interface cards, controller chips, chipsets, or other devices that may be used by the controller device 116 to connect with another compute device (e.g., an edge gateway node). In some examples, the NIC 218 may be embodied as part of a system-on-a-chip (SoC) that includes one or more processors, or included on a multichip package that also contains one or more processors. In some examples, the NIC 218 may include a local processor (not shown) and/or a local memory (not shown) that are both local to the NIC 218. In such examples, the local processor of the NIC 218 may be capable of performing one or more of the functions of the compute circuitry 202 described herein. Additionally, or alternatively, in such examples, the local memory of the NIC 218 may be integrated into one or more components of the client compute node at the board level, socket level, chip level, and/or other levels. In some embodiments, the controller device 116 may interface with some or all of the sensors and/or actuators of the system 100 through the communication subsystem 212.

The sensor/actuator interface 214 may interface with any sensor and/or actuator of the system 100 through any suitable wired or wireless connection, such as the bus 142 or the bus 144. The sensor/actuator interface 214 may perform any suitable analog and/or digital communication or measurement on the sensors and/or actuators of the system 100, such as any suitable voltage and/or current-based signaling.

Additionally, in some examples, a controller device 116 may include one or more peripheral devices 216. Such peripheral devices 216 may include any type of peripheral device found in a compute device or server such as audio input devices, a display, other input/output devices, interface devices, and/or other peripheral devices, depending on the particular type of the controller device 116.

Figure 3:
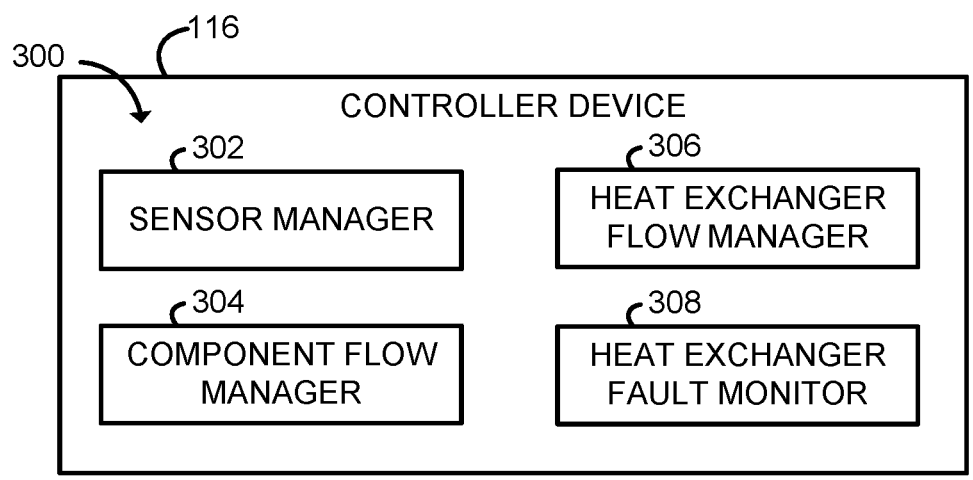
FIG. 3 is a simplified block diagram of at least one embodiment of an environment that may be established by the controller device of FIG. 2.

Referring now to FIG. 3, in an illustrative embodiment, the controller device 116 establishes an environment 300 during operation. The illustrative environment 300 includes a sensor manager 302, a component flow manager 304, a heat exchanger flow manager 306, and a heat exchanger fault monitor 308. The various modules of the environment 300 may be embodied as hardware, software, firmware, or a combination thereof. For example, the various modules, logic, and other components of the environment 300 may form a portion of, or otherwise be established by, the processor 204 or other hardware components of the controller device 116 such as the memory 206, the data storage 210, etc. As such, in some embodiments, one or more of the modules of the environment 300 may be embodied as circuitry or collection of electrical devices (e.g., sensor manager circuitry 302, component flow manager circuitry 304, heat exchanger flow manager circuitry 306, etc.). In some embodiments, some or all of the modules of the environment 300 may be embodied as, e.g., a field-programmable gate array (FPGA), an application-specific integrated circuit (ASIC), an accelerator device, and/or the like. It should be appreciated that, in some embodiments, one or more of the circuits (e.g., the sensor manager circuitry 302, the component flow manager circuitry 304, the heat exchanger flow manager circuitry 306, etc.) may form a portion of one or more of the processor 204, the memory 206, the I/O subsystem 208, the data storage 210, and/or other components of the controller device 116. For example, in some embodiments, some or all of the modules may be embodied as the processor 204 as well as the memory 206 and/or data storage 210 storing instructions to be executed by the processor 204. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 204 or other components of the controller device 116. It should be appreciated that some of the functionality of one or more of the modules of the environment 300 may require a hardware implementation, in which case embodiments of modules that implement such functionality will be embodied at least partially as hardware.

The sensor manager 302, which may be embodied as hardware, firmware, software, virtualized hardware, emulated architecture, and/or a combination thereof as discussed above, is configured to manage and interface with the sensors of the system 100, such as temperature sensor 124, flow sensors 122, temperature sensors 134, temperature sensors 136, flow sensors 126, fan sensors 140, etc. The sensor manager 302 may receive data from any or all of the sensors continuously, continually, periodically, or in any other suitable manner.

The component flow manager 304, which may be embodied as hardware, firmware, software, virtualized hardware, emulated architecture, and/or a combination thereof, as discussed above, is configured to manage the flow of liquid coolant to the various components of the compute devices 102 to be cooled. The component flow manager 304 may use any suitable information to control the flow of coolant to the components. For example, the component flow manager 304 may determine the current workload information of the compute devices 102 with components to be cooled. The workload information may be embodied as, e.g., an indication of a particular application or set of applications being executed on the compute devices 102, a current power level for some or all of the components to be cooled, etc.

The component flow manager 304 may determine a target temperature for the components to be cooled. The target temperatures may be determined in any suitable manner. For example, in one embodiment, the component flow manager 304 may access target temperatures from local storage. In another embodiment, the component flow manager 304 may receive target temperatures from a remote device, such as the compute devices 102 with components to be cooled, an orchestrator server, an administrator device, etc. The target temperatures may depend on the type of component being cooled. For example, a CPU may have a different target temperature as a GPU or ASIC. The target temperature may indicate a maximum temperature, a desired operating temperature, etc.

The component flow manager 304 may manage the flow of coolant to the components in any suitable manner. For example, if the component temperature of a component is at or over a target temperature for the component, the component flow manager 304 may increase coolant flow to the corresponding component by opening the corresponding valve 118 more. As another example, if the component temperature of a component is below a target temperature for the component, the component flow manager 304 may decrease coolant flow to the corresponding component by closing the corresponding valve 118 more. As a further example, if a first component has a sensed temperature over a target temperature, the component flow manager 304 may decrease coolant flow to a second component that has a sensed temperature under a target temperature, allowing for some of the coolant to be diverted to the from the second component to the first component. The component flow manager 304 may use any suitable algorithm or algorithms to control the flow of coolant to the coolants, such as a proportional-integral-differential (PID) controller, a machine-learning-based algorithm, a threshold-based algorithm, etc.

The heat exchanger flow manager 306, which may be embodied as hardware, firmware, software, virtualized hardware, emulated architecture, and/or a combination thereof, as discussed above, is configured to controls the flow of liquid coolant through the heat exchangers 110. The heat exchanger flow manager 306 may manage the flow of coolant to the heat exchangers 110 in any suitable manner. For example, if a component temperature is above a target temperature or the heat exchanger flow manager 306 otherwise determines that not enough coolant is flowing or that the coolant is not being cooled enough, the heat exchanger flow manager 306 may increase the coolant flow (such as by more fully opening the valve 120 and/or controlling the pump 130) and/or fan speed. Additionally or alternatively, the heat exchanger flow manager 306 may open flow to a heat exchanger 110 that previously had its valve 120 fully closed. In another example, if a component temperature is under a target temperature or the heat exchanger flow manager 306 otherwise determines that more than enough coolant is flowing or that the coolant is being cooled more than enough, the heat exchanger flow manager 306 may decrease the coolant flow (such as by more fully closing the valve 120 and/or controlling the pump 130) and/or fan speed. Additionally or alternatively, heat exchanger flow manager 306 may close flow to a heat exchanger 110 that previously had its valve 120 at least partially open.

The heat exchanger fault monitor 308, which may be embodied as hardware, firmware, software, virtualized hardware, emulated architecture, and/or a combination thereof, as discussed above, is configured to monitor the heat exchangers 110 for possible faults. To do so, the heat exchanger fault monitor 308 may, e.g., determine whether a temperature drop across the heat exchanger (i.e., the temperature difference between the inlet temperature sensor 134 and outlet temperature sensor 136) is an expected amount. For example, if the inlet temperature sensor 134 indicates that the liquid coolant at the inlet of the heat exchanger 110 is above ambient temperature, and the heat exchanger 110 is supposed to cool the liquid coolant using ambient air, the outlet temperature sensor 136 should indicate that the liquid coolant at the outlet of the heat exchanger 110 is closer to the temperature of the ambient air. If it does not, then the heat exchanger 110 may be faulty. As another example, if a heat exchanger 110 flows through several consecutive areas cooled by separate fans, the temperature of the air exhaust at each fan 138 should get progressively cooler. If it does not, then the controller device 116 may determine that the temperature of the air of a fan exhaust is not in an expected temperature range, indicating a fault. As a further example, if a flow rate indicated by a flow rate sensor 126 is less than the flow should be based on the pump 130, the heat exchanger 110 may have a faulty pump 130.

If a heat exchanger is faulty, the heat exchanger fault monitor 308 closes a valve 120 to the faulty heat exchanger 110 and turns off the corresponding pump 130. The heat exchanger fault monitor 308 may also open a valve 120 to a backup heat exchanger 110, compensating for the decrease in cooling provided by the faulty heat exchanger 110. As a result, the system 100 can be self-healing and fault-tolerant.

If a faulty heat exchanger is found, the heat exchanger fault monitor 308 alerts an administrator of the faulty heat exchanger 110. For example, the heat exchanger fault monitor 308 may send an email to the administrator with a unique identification number that identifies the heat exchanger 110 and/or a component of the heat exchanger 110 that may be faulty, such as a fan 138, a pump 130, etc.

Figure 4:
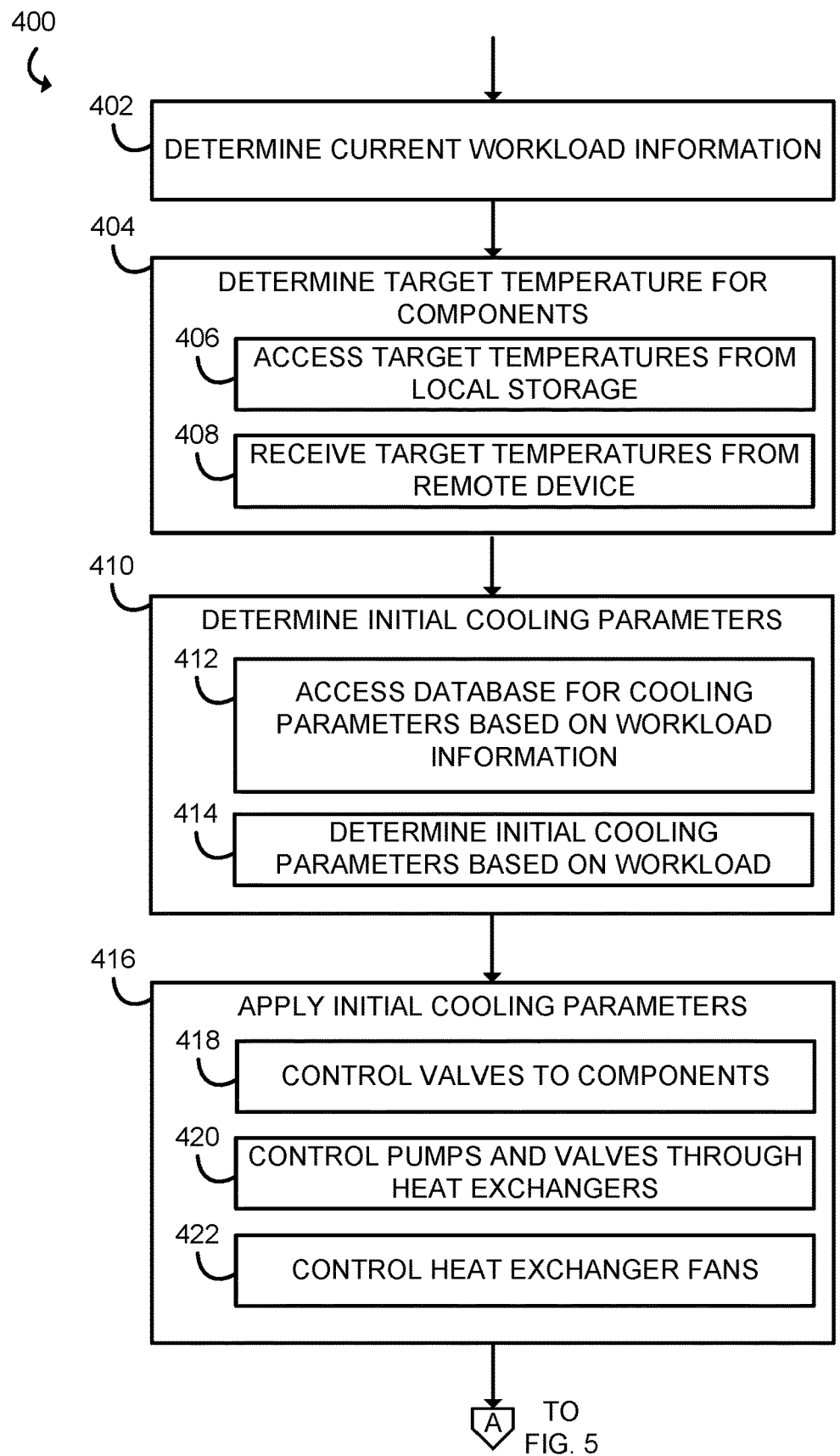
FIGS. 4-7 are a simplified flow diagram of at least one embodiment of a method for controlling cooling parameters that may be executed by the controller device of FIG. 2.

Referring now to FIG. 4, in use, a controller device 116 may execute a method 400 for managing a network of heat exchangers 110 and components to be cooled. The method 400 begins in block 402, in which the controller device 116 determines current workload information of the compute devices 102 with components to be cooled. The workload information may be embodied as, e.g., an indication of a particular application or set of applications being executed on the compute devices 102, a current power level for some or all of the components to be cooled, etc.

In block 404, the controller device 116 determines a target temperature for the components to be cooled. The target temperatures may be determined in any suitable manner. For example, in one embodiment, the controller device 116 may access target temperatures from local storage in block 406. In another embodiment, in block 408, the controller device 116 may receive target temperatures from a remote device, such as the compute devices 102 with components to be cooled, an orchestrator server, an administrator device, etc. The target temperatures may depend on the type of component being cooled. For example, a CPU may have a different target temperature as a GPU or ASIC. The target temperature may indicate a maximum temperature, a desired operating temperature, etc.

In block 410, the controller device 116 may determine initial cooling parameters. The controller device 116 may access a database for cooling parameters based on the workload information in block 412. For example, if the controller device 116 has previously operated with the same or similar set of operating conditions (e.g., the same or similar set of current operating power for each component to be cooled), the controller device 116 may access the parameters used to operate the system 100 under those conditions at a previous time. In block 414, the controller device 116 may determine initial cooling parameters based on the workload. For example, the controller device 116 may calculate how much cooling is required based on the power of each component, the target temperature of each component, etc. In some embodiments, the controller device 116 may simply fully open all heat exchanger valves 120 and/or all component valves 118 and lower cooling as appropriate after the system 100 has been operating for enough time to approach equilibrium. In other embodiments, the controller device 116 may open few than all of the heat exchangers 110 and/or may not fully open the heat exchanger valves 120 and/or the component valves 118, and the controller device 116 may then open more heat exchangers 110 and/or more fully open the heat exchanger valves 120 and/or the component valves 118 as necessary to meet cooling needs.

In block 416, the controller device 116 applies the initial cooling parameters. The controller device 116 controls the component valves 118 in block 418. The controller device 116 controls the pumps 130 and the heat exchanger valves 120 in block 420. The controller device 116 controls the heat exchanger fans 138 in block 416.

Figure 5:
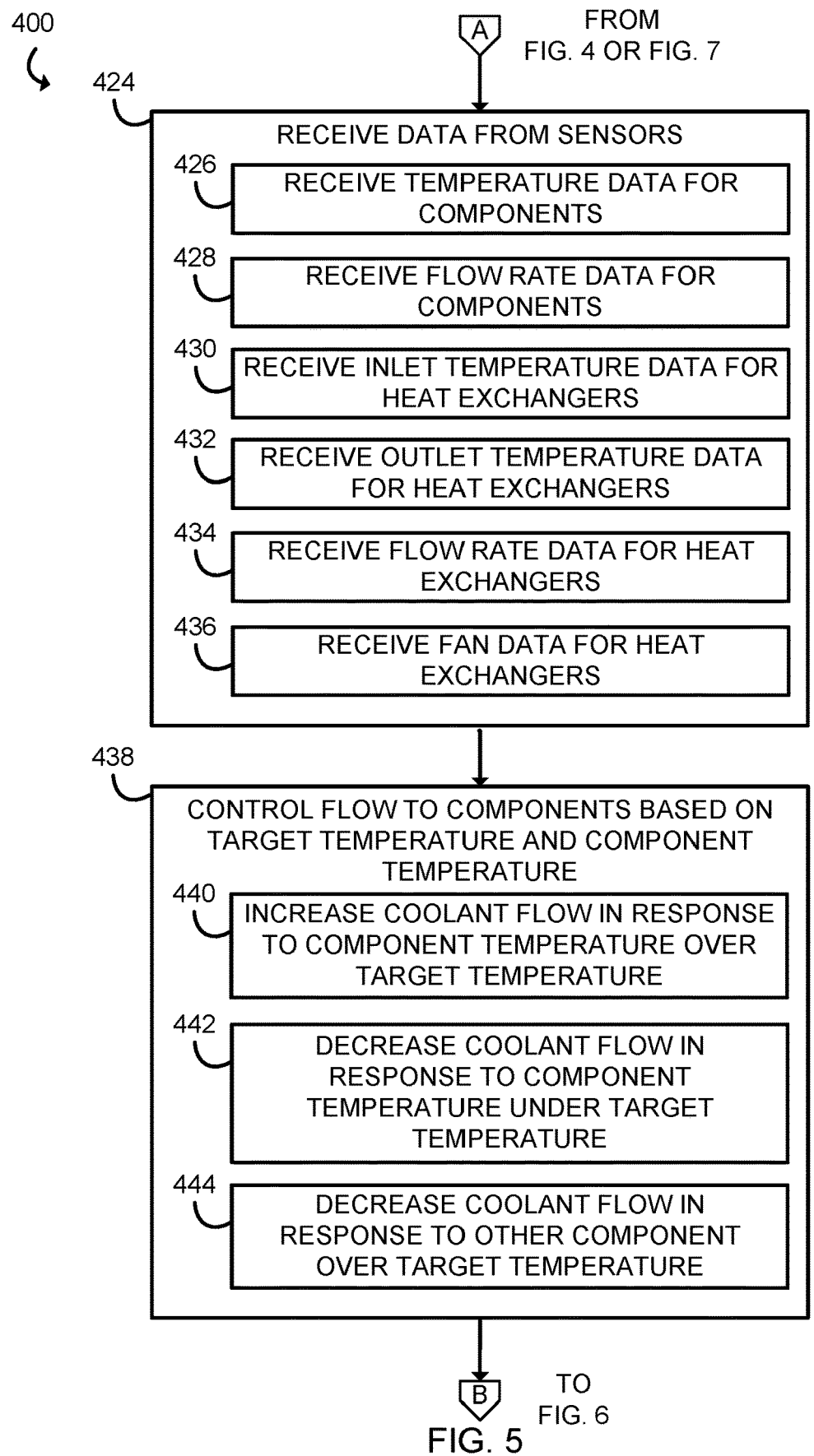

Referring now to FIG. 5, in block 424, the controller device 116 receives data from sensors. The controller device 116 receives temperature data for the components to be cooled from the temperature sensors 124 in block 426. The controller device 116 receives flow rate data for the components to be cooled from the flow sensors 122 in block 428. The controller device 116 receives inlet temperature data for the heat exchangers 110 from the temperature sensors 134 in block 430. The controller device 116 receives outlet temperature data for the heat exchangers 110 from the temperature sensors 136 in block 432. The controller device 116 receives flow rate data for the heat exchangers from the flow sensors 126 in block 434. The controller device 116 receives fan data (such as air outlet temperature and/or rotation rate) for the fans 138 from the fan sensors 140 in block 436.

In block 438, the controller device 116 controls flow to components based on the target temperature and the sensed component temperature. For example, in block 440, if the component temperature of a component is at or over a target temperature for the component, the controller device 116 increases coolant flow to the corresponding component by opening the corresponding valve 118 more. As another example, in block 442, if the component temperature of a component is below a target temperature for the component, the controller device 116 may decrease coolant flow to the corresponding component by closing the corresponding valve 118 more. As a further example, in block 444, if a first component has a sensed temperature over a target temperature, the controller device 116 may decrease coolant flow to a second component that has a sensed temperature under a target temperature, allowing for some of the coolant to be diverted to the from the second component to the first component. In this manner, target temperature load balancing can be achieved for some or all of the components of the system 100. It should be appreciated that the controller device 116 may use any suitable algorithm or algorithms to control the flow of coolant to the coolants, such as a proportional-integral-differential (PID) controller, a machine-learning-based algorithm, a threshold-based algorithm, etc.

Figure 6:
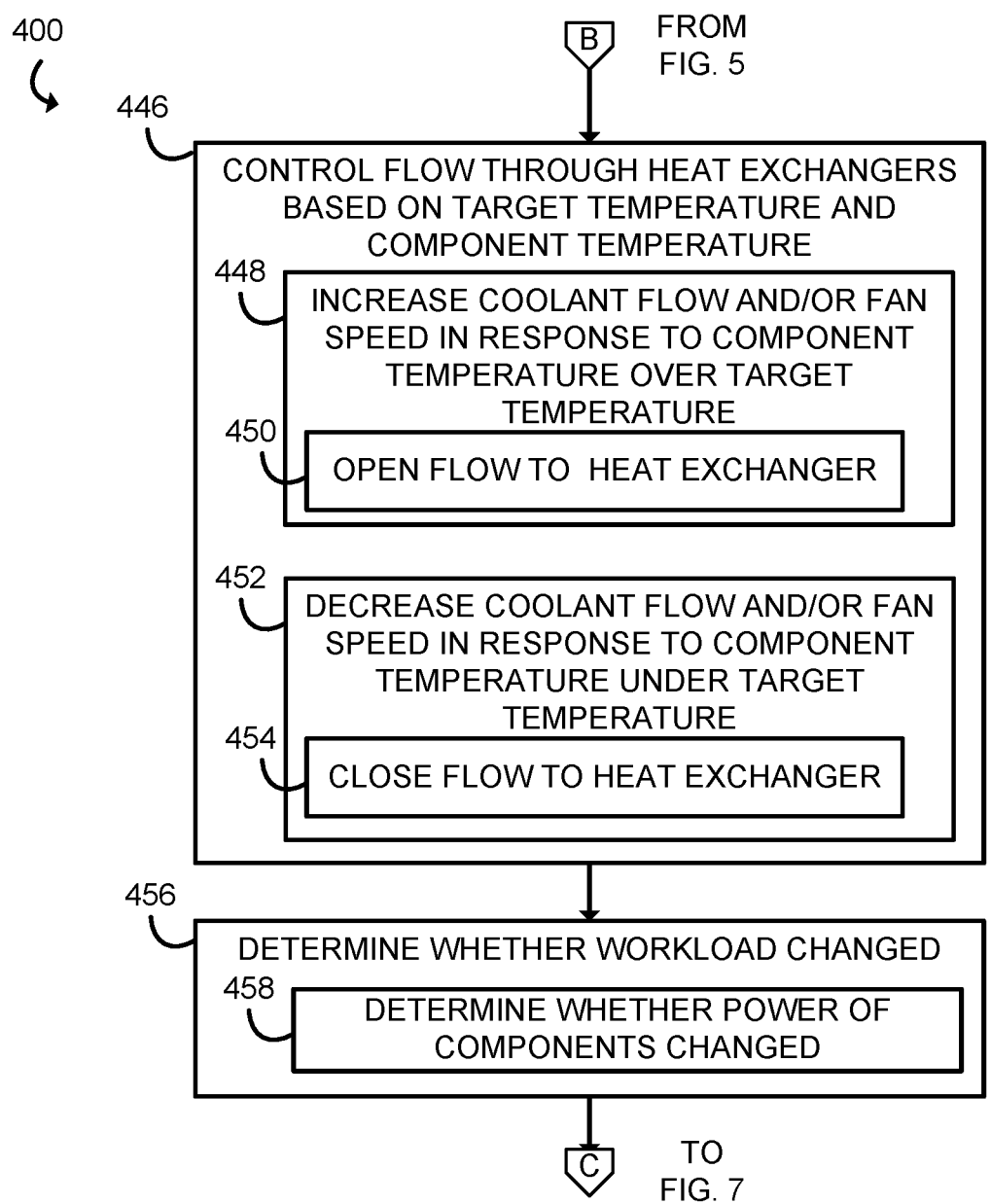

Referring now to FIG. 6, in block 446, the controller device 116 controls the flow of liquid coolant through the heat exchangers 110. For example, if a component temperature is above a target temperature or the controller device 116 otherwise determines that not enough coolant is flowing or that the coolant is not being cooled enough, the controller device 116 may increase the coolant flow (such as by more fully opening the valve 120 and/or controlling the pump 130) and/or fan speed in block 448. Additionally or alternatively, the controller device 116 may open flow to a heat exchanger 110 that previously had its valve 120 fully closed in block 450. In another example, if a component temperature is under a target temperature or the controller device 116 otherwise determines that more than enough coolant is flowing or that the coolant is being cooled more than enough, the controller device 116 may decrease the coolant flow (such as by more fully closing the valve 120 and/or controlling the pump 130) and/or fan speed in block 452. Additionally or alternatively, the controller device 116 may close flow to a heat exchanger 110 that previously had its valve 120 at least partially open in block 454.

In block 456, the controller device 116 determines whether a workload has changed. The controller device 116 may, e.g., receive an indication that the applications or tasks being performed on the compute device 102 have changed. In block 458, the controller device 116 may receive an indication of a change in power used by the various components being cooled has changed.

Figure 7:
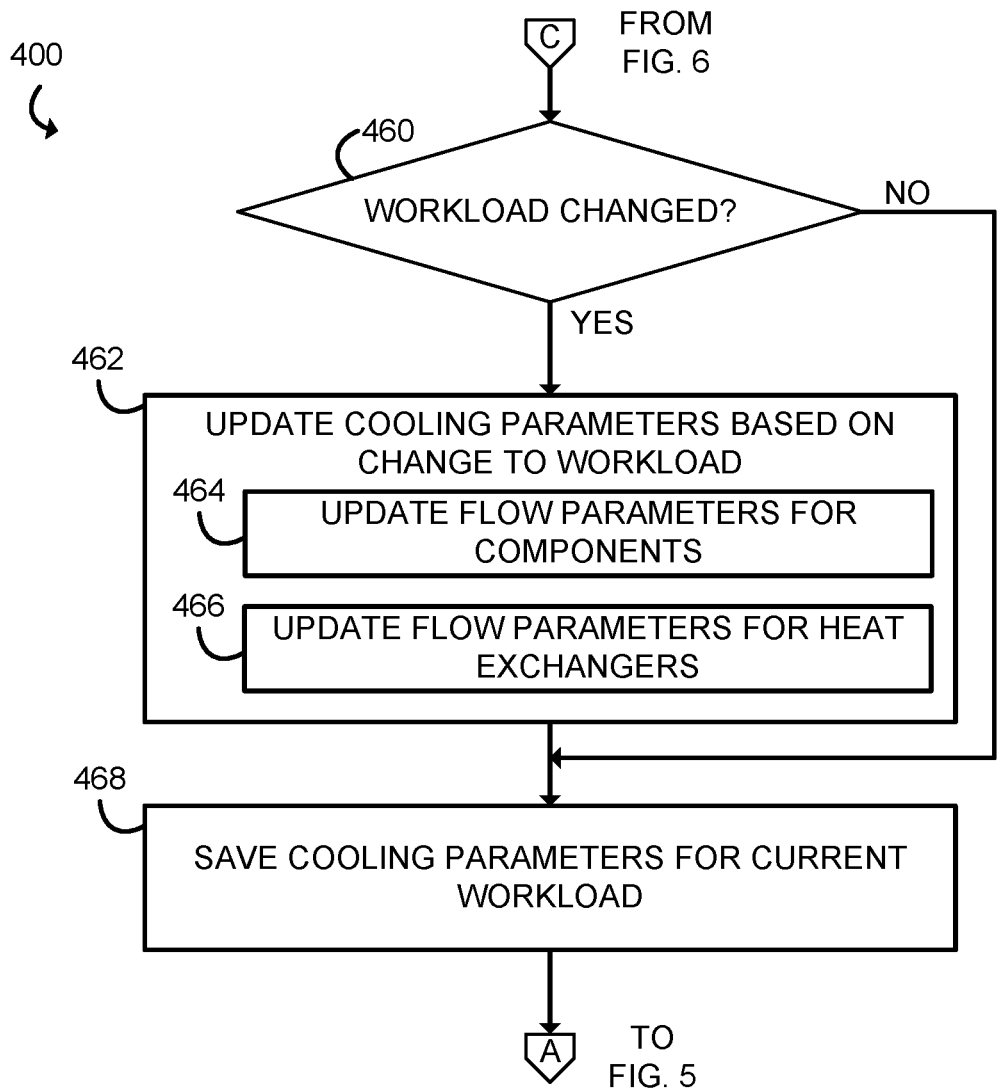

Referring now to FIG. 7, in block 460, if the workload has not changed, the method 400 jumps to block 468, in which the current cooling parameters for the current workload are saved. If the workload has changed, the method 400 proceeds to block 462, in which the controller device 116 updates cooling parameters based on the change to the workload. For example, the controller device 116 may update flow parameters for the components in block 464 and/or may update flow parameters for the components in block 466. The controller device 116 may determine suitable cooling parameters in a similar manner as in block 410 described above. In some embodiments, the controller device 116 may determine cooling parameters over time based on the workload. For example, if a particular workload is known to use a high power initially and then lower power, the controller device 116 may control the cooling parameters to provide high cooling for a certain amount of time and then control the cooling parameters to provide lower cooling.

In block 468, the controller device 116 saves the cooling parameters for the current workload. For example, the controller device 116 may save an indication of a setting for each valve 118, 120 and pump 130 that leads to suitable cooling for each component at a particular power level for each component. The method 400 then loops back to block 424 in FIG. 5 to receive more data from the sensors.

Figure 8:
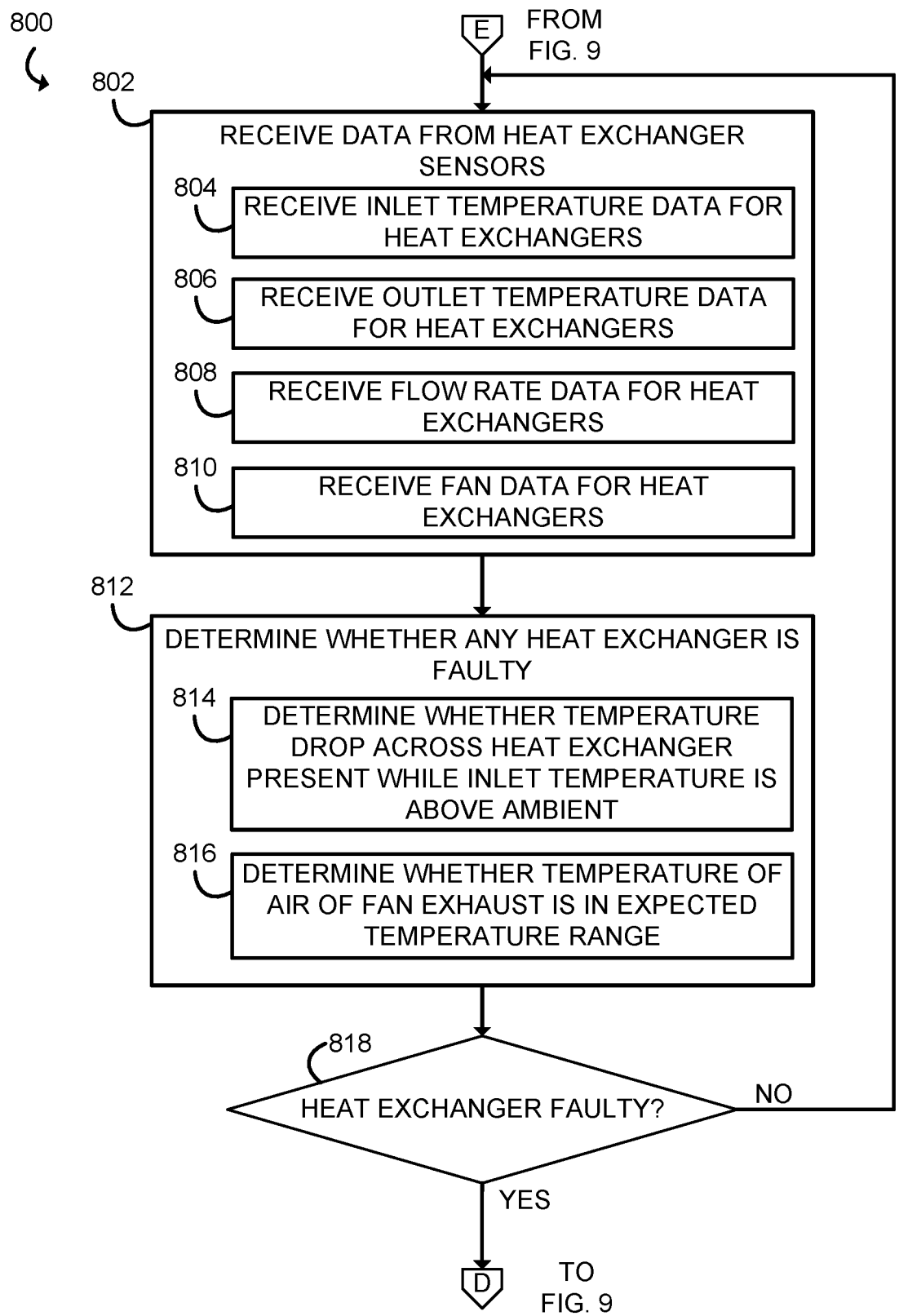
FIGS. 8 and 9 are a simplified flow diagram of at least one embodiment of a method for managing a heat exchanger network that may be executed by the controller device of FIG. 2.

Referring now to FIG. 8, in use, a controller device 116 may execute a method 800 for monitoring heat exchangers 110 for a fault. The method 800 begins in block 802, in which the controller device 116 receives data from sensors of the heat exchangers 110. The controller device 116 receives inlet temperature data for the heat exchangers 110 from the temperature sensors 134 in block 804. The controller device 116 receives outlet temperature data for the heat exchangers 110 from the temperature sensors 136 in block 806. The controller device 116 receives flow rate data for the heat exchangers from the flow sensors 126 in block 810. The controller device 116 receives fan data (such as air outlet temperature and/or rotation rate) for the fans 138 from the fan sensors 140 in block 810.

In block 812, the controller device 116 determines whether a heat exchanger 110 is faulty. A heat exchanger 110 may be faulty because, e.g., fans 138 are blowing air, the heat exchanger 110 is clogged and not allowing coolant to flow through, a pump 130 is broken, the heat exchanger 110 has a leak, airflow to the heat exchanger 110 is blocked, etc. To determine whether the heat exchanger 110 is faulty, the controller device 116 may, e.g., determine whether a temperature drop across the heat exchanger (i.e., the temperature difference between the inlet temperature sensor 134 and outlet temperature sensor 136) is an expected amount in block 814. For example, if the inlet temperature sensor 134 indicates that the liquid coolant at the inlet of the heat exchanger 110 is above ambient temperature, and the heat exchanger 110 is supposed to cool the liquid coolant using ambient air, the outlet temperature sensor 136 should indicate that the liquid coolant at the outlet of the heat exchanger 110 is closer to the temperature of the ambient air. If it does not, then the heat exchanger 110 may be faulty. As another example, if a heat exchanger 110 flows through several consecutive areas cooled by separate fans, the temperature of the air exhaust at each fan 138 should get progressively cooler. If it does not, then the controller device 116 may determine that the temperature of the air of a fan exhaust is not in an expected temperature range in block 816, indicating a fault. As a further example, if a flow rate indicated by a flow rate sensor 126 is less than the flow should be based on the pump 130, the heat exchanger 110 may have a faulty pump 130.

Figure 9:
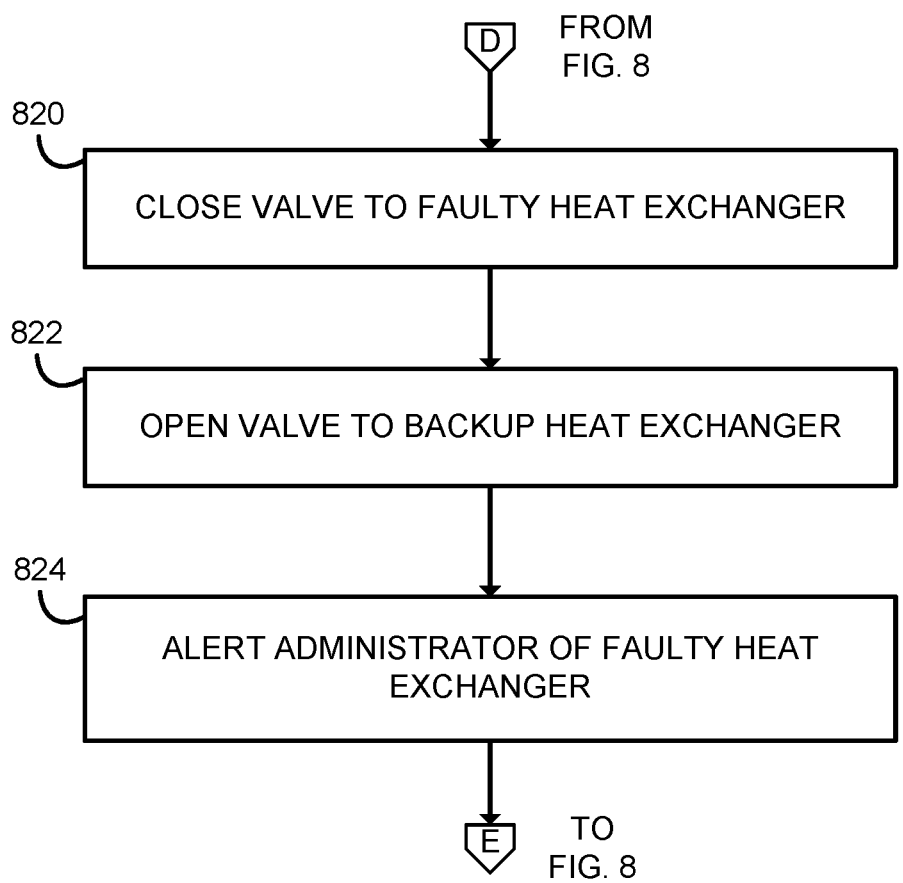

In block 818, if no heat exchanger is faulty, the method 800 loops back to block 802 to continue to receive data from heat exchanger sensors. If a heat exchanger is faulty, the method 800 proceeds to block 820 in FIG. 9. In block 820, the controller device 116 closes a valve 120 to the faulty heat exchanger 110 and turns off the corresponding pump 130. The controller device 116 may also open a valve 120 to a backup heat exchanger 110 in block 822, compensating for the decrease in cooling provided by the faulty heat exchanger 110. As a result, the system 100 can be self-healing and fault-tolerant.

In block 824, the controller device 116 alerts an administrator of the faulty heat exchanger 110. For example, the controller device 116 may send an email to the administrator with a unique identification number that identifies the heat exchanger 110 and/or a component of the heat exchanger 110 that may be faulty, such as a fan 138, a pump 130, etc. The method 800 then loops back to block 802 in FIG. 8 to continue monitoring sensors of the heat exchangers 110.

The technologies described herein can be performed by or implemented in any of a variety of computing systems, including mobile computing systems (e.g., smartphones, handheld computers, tablet computers, laptop computers, portable gaming consoles, 2-in-1 convertible computers, portable all-in-one computers), non-mobile computing systems (e.g., desktop computers, servers, workstations, stationary gaming consoles, set-top boxes, smart televisions, rack-level computing solutions (e.g., blades, trays, sleds)), and embedded computing systems (e.g., computing systems that are part of a vehicle, smart home appliance, consumer electronics product or equipment, manufacturing equipment). As used herein, the term "computing system" includes computing devices and includes systems comprising multiple discrete physical components. In some embodiments, the computing systems are located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), a micro data center (e.g., a data center typically having a smaller footprint than other data center types), and an edge data center (e.g., a data center, typically having a smaller footprint than other data center types, located close to the geographic area that it serves).

Figure 10:
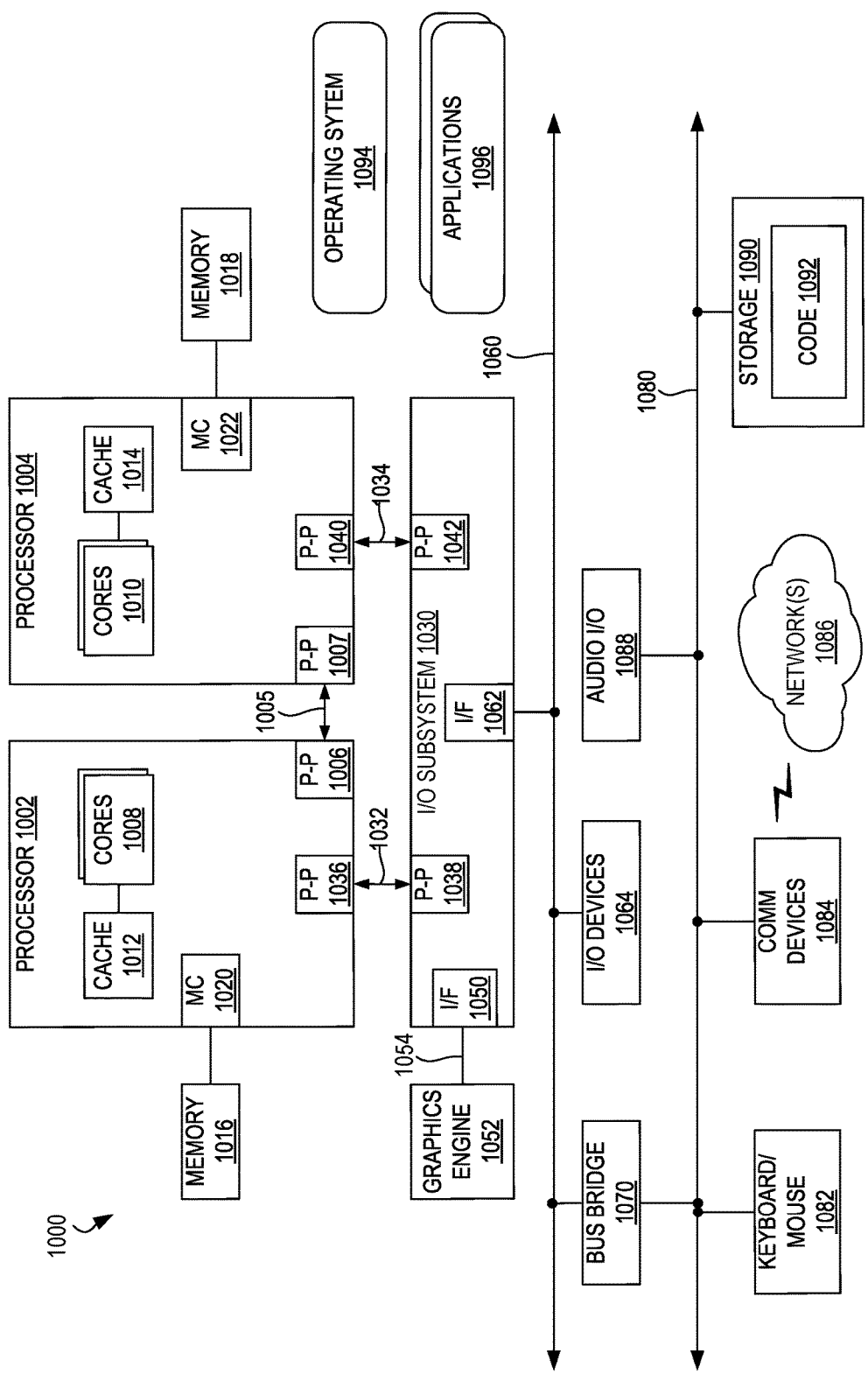
FIG. 10 is a block diagram of an exemplary computing system in which technologies described herein may be implemented.

FIG. 10 is a block diagram of a second example computing system in which technologies described herein may be implemented. Generally, components shown in FIG. 10 can communicate with other shown components, although not all connections are shown, for ease of illustration. In some embodiments, the compute device 102 and/or the controller device 116 of the system 100 may be embodied as or otherwise include some or all of the components of the computing system 1000. The computing system 1000 is a multiprocessor system comprising a first processor unit 1002 and a second processor unit 1004 comprising point-to-point (P-P) interconnects. A point-to-point (P-P) interface 1006 of the processor unit 1002 is coupled to a point-to-point interface 1007 of the processor unit 1004 via a point-to-point interconnection 1005. It is to be understood that any or all of the point-to-point interconnects illustrated in FIG. 10 can be alternatively implemented as a multi-drop bus, and that any or all buses illustrated in FIG. 10 could be replaced by point-to-point interconnects.

The processor units 1002 and 1004 comprise multiple processor cores. Processor unit 1002 comprises processor cores 1008 and processor unit 1004 comprises processor cores 1010. Processor cores 1008 and 1010 can execute computer-executable instructions in a manner similar to that discussed below in connection with FIG. 11, or other manners.

Processor units 1002 and 1004 further comprise cache memories 1012 and 1014, respectively. The cache memories 1012 and 1014 can store data (e.g., instructions) utilized by one or more components of the processor units 1002 and 1004, such as the processor cores 1008 and 1010. The cache memories 1012 and 1014 can be part of a memory hierarchy for the computing system 1000. For example, the cache memories 1012 can locally store data that is also stored in a memory 1016 to allow for faster access to the data by the processor unit 1002. In some embodiments, the cache memories 1012 and 1014 can comprise multiple cache levels, such as level 1 (L1), level 2 (L2), level 3 (L3), level 4 (L4), and/or other caches or cache levels, such as a last level cache (LLC). Some of these cache memories (e.g., L2, L3, L4, LLC) can be shared among multiple cores in a processor unit. One or more of the higher levels of cache levels (the smaller and faster caches) in the memory hierarchy can be located on the same integrated circuit die as a processor core and one or more of the lower cache levels (the larger and slower caches) can be located on an integrated circuit dies that are physically separate from the processor core integrated circuit dies.

Although the computing system 1000 is shown with two processor units, the computing system 1000 can comprise any number of processor units. Further, a processor unit can comprise any number of processor cores. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processing units. As such, the processor unit can be referred to as an XPU (or xPU). Further, a processor unit can comprise one or more of these various types of processing units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

In some embodiments, the computing system 1000 can comprise one or more processor units that are heterogeneous or asymmetric to another processor unit in the computing system. There can be a variety of differences between the processing units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 1002 and 1004 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetric can be among processor units located in the same integrated circuit component.

Processor units 1002 and 1004 further comprise memory controller logic (MC) 1020 and 1022. As shown in FIG. 10, MCs 1020 and 1022 control memories 1016 and 1018 coupled to the processor units 1002 and 1004, respectively. The memories 1016 and 1018 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 1020 and 1022 are illustrated as being integrated into the processor units 1002 and 1004, in alternative embodiments, the MCs can be external to a processor unit.

Processor units 1002 and 1004 are coupled to an Input/Output (I/O) subsystem 1030 via point-to-point interconnections 1032 and 1034. The point-to-point interconnection 1032 connects a point-to-point interface 1036 of the processor unit 1002 with a point-to-point interface 1038 of the I/O subsystem 1030, and the point-to-point interconnection 1034 connects a point-to-point interface 1040 of the processor unit 1004 with a point-to-point interface 1042 of the I/O subsystem 1030. Input/Output subsystem 1030 further includes an interface 1050 to couple the I/O subsystem 1030 to a graphics engine 1052. The I/O subsystem 1030 and the graphics engine 1052 are coupled via a bus 1054.

The Input/Output subsystem 1030 is further coupled to a first bus 1060 via an interface 1062. The first bus 1060 can be a Peripheral Component Interconnect Express (PCIe) bus or any other type of bus. Various I/O devices 1064 can be coupled to the first bus 1060. A bus bridge 1070 can couple the first bus 1060 to a second bus 1080. In some embodiments, the second bus 1080 can be a low pin count (LPC) bus. Various devices can be coupled to the second bus 1080 including, for example, a keyboard/mouse 1082, audio I/O devices 1088, and a storage device 1090, such as a hard disk drive, solid-state drive, or another storage device for storing computer-executable instructions (code) 1092 or data. The code 1092 can comprise computer-executable instructions for performing methods described herein. Additional components that can be coupled to the second bus 1080 include communication device(s) 1084, which can provide for communication between the computing system 1000 and one or more wired or wireless networks 1086 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

In embodiments where the communication devices 1084 support wireless communication, the communication devices 1084 can comprise wireless communication components coupled to one or more antennas to support communication between the computing system 1000 and external devices. The wireless communication components can support various wireless communication protocols and technologies such as Near Field Communication (NFC), IEEE 1002.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 1000 can comprise removable memory such as flash memory cards (e.g., SD (Secure Digital) cards), memory sticks, Subscriber Identity Module (SIM) cards). The memory in system 1000 (including caches 1012 and 1014, memories 1016 and 1018, and storage device 1090) can store data and/or computer-executable instructions for executing an operating system 1094 and application programs 1096. Example data includes web pages, text messages, images, sound files, and video data to be sent to and/or received from one or more network servers or other devices by the system 1000 via the one or more wired or wireless networks 1086, or for use by the system 1000. The system 1000 can also have access to external memory or storage (not shown) such as external hard drives or cloud-based storage.

The operating system 1094 can control the allocation and usage of the components illustrated in FIG. 10 and support the one or more application programs 1096. The application programs 1096 can include common computing system applications (e.g., email applications, calendars, contact managers, web browsers, messaging applications) as well as other computing applications.

The computing system 1000 can support various additional input devices, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 1000. External input and output devices can communicate with the system 1000 via wired or wireless connections.

In addition, the computing system 1000 can provide one or more natural user interfaces (NUIs). For example, the operating system 1094 or applications 1096 can comprise speech recognition logic as part of a voice user interface that allows a user to operate the system 1000 via voice commands. Further, the computing system 1000 can comprise input devices and logic that allows a user to interact with computing the system 1000 via body, hand or face gestures.

The system 1000 can further include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 1000 can further comprise one or more additional antennas coupled to one or more additional receivers, transmitters, and/or transceivers to enable additional functions.

It is to be understood that FIG. 10 illustrates only one example computing system architecture. Computing systems based on alternative architectures can be used to implement technologies described herein. For example, instead of the processors 1002 and 1004 and the graphics engine 1052 being located on discrete integrated circuits, a computing system can comprise an SoC (system-on-a-chip) integrated circuit incorporating multiple processors, a graphics engine, and additional components. Further, a computing system can connect its constituent component via bus or point-to-point configurations different from that shown in FIG. 10. Moreover, the illustrated components in FIG. 10 are not required or all-inclusive, as shown components can be removed and other components added in alternative embodiments.

Figure 11:
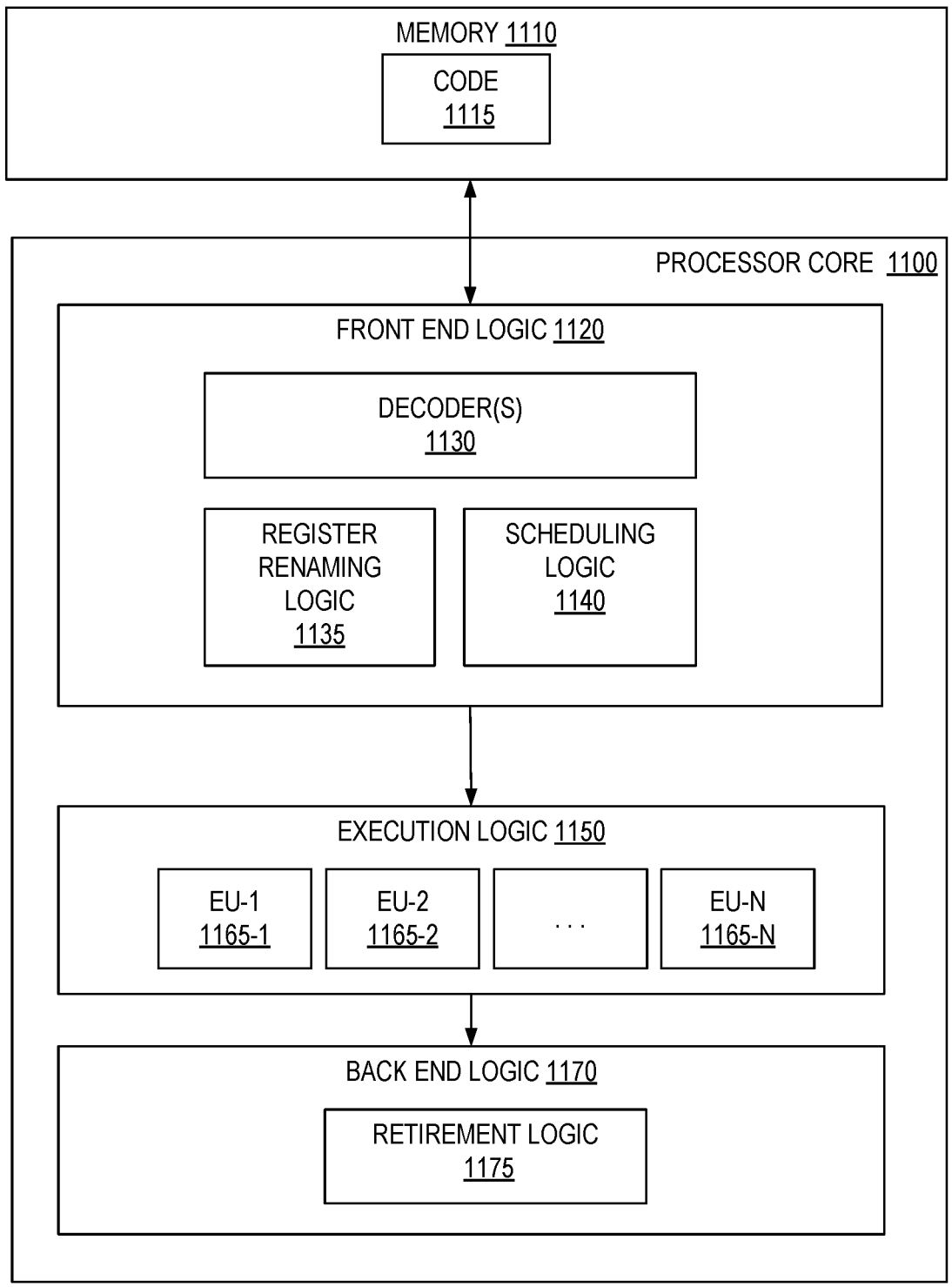
FIG. 11 is a block diagram of an exemplary processor unit that can execute instructions as part of implementing technologies described herein.

FIG. 11 is a block diagram of an example processor unit 1100 to execute computer-executable instructions as part of implementing technologies described herein. The processor unit 1100 can be a single-threaded core or a multithreaded core in that it may include more than one hardware thread context (or "logical processor") per processor unit.

FIG. 11 also illustrates a memory 1110 coupled to the processor unit 1100. The memory 1110 can be any memory described herein or any other memory known to those of skill in the art. The memory 1110 can store computer-executable instructions 1115 (code) executable by the processor core 1100.

The processor unit comprises front-end logic 1120 that receives instructions from the memory 1110. An instruction can be processed by one or more decoders 1130. The decoder 1130 can generate as its output a micro-operation such as a fixed width micro operation in a predefined format, or generate other instructions, microinstructions, or control signals, which reflect the original code instruction. The front-end logic 1120 further comprises register renaming logic 1135 and scheduling logic 1140, which generally allocate resources and queues operations corresponding to converting an instruction for execution.

The processor unit 1100 further comprises execution logic 1150, which comprises one or more execution units (EUs) 1165-1 through 1165-N. Some processor unit embodiments can include a number of execution units dedicated to specific functions or sets of functions. Other embodiments can include only one execution unit or one execution unit that can perform a particular function. The execution logic 1150 performs the operations specified by code instructions. After completion of execution of the operations specified by the code instructions, back-end logic 1170 retires instructions using retirement logic 1175. In some embodiments, the processor unit 1100 allows out of order execution but requires in-order retirement of instructions. Retirement logic 1175 can take a variety of forms as known to those of skill in the art (e.g., re-order buffers or the like).

The processor unit 1100 is transformed during execution of instructions, at least in terms of the output generated by the decoder 1130, hardware registers and tables utilized by the register renaming logic 1135, and any registers (not shown) modified by the execution logic 1150.

As used in any embodiment herein, the term "module" refers to logic that may be implemented in a hardware component or device, software or firmware running on a processor, or a combination thereof, to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hardwired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry. A computing system referred to as being programmed to perform a method can be programmed to perform the method via software, hardware, firmware or combinations thereof.

The computer-executable instructions or computer program products as well as any data created and used during implementation of the disclosed technologies can be stored on one or more tangible or non-transitory computer-readable storage media, such as optical media discs (e.g., DVDs, CDs), volatile memory components (e.g., DRAM, SRAM), or non-volatile memory components (e.g., flash memory, solid-state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be read and executed by, for example, a single computing device or in a network environment using one or more networked computers. Further, it is to be understood that the disclosed technology is not limited to any specific computer language or program. For instance, the disclosed technologies can be implemented by software written in C++, Java, Perl, Python, JavaScript, Adobe Flash, or any other suitable programming language. Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrase "at least one of A, B or C" can mean A; B; C; A and B; A and C; B and C; or A, B and C. Moreover, as used in this application and in the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

EXAMPLES

Illustrative examples of the technologies disclosed herein are provided below. An embodiment of the technologies may include any one or more, and any combination of, the examples described below.

Example 1 includes a system comprising a plurality of components of one or more compute devices; a plurality of heat exchangers; an inlet manifold connected to individual components of the plurality of components and individual heat exchangers of the plurality of heat exchangers, the inlet manifold to carry liquid coolant from the plurality of heat exchangers to the plurality of components; an outlet manifold connected to individual components of the plurality of components and individual heat exchangers of the plurality of heat exchangers, the outlet manifold to carry liquid coolant from the plurality of components to the plurality of heat exchangers; a plurality of component valves, wherein individual component valves of the plurality of component valves control flow of liquid coolant to a corresponding component of the plurality of components; a plurality of heat exchanger valves, wherein individual heat exchanger valves of the plurality of heat exchanger valves control flow of liquid coolant to a corresponding heat exchanger of the plurality of heat exchangers; and a controller device to control the plurality of component valves and the plurality of heat exchanger valves.

Example 2 includes the subject matter of Example 1, and wherein the controller device is to determine a target temperature for individual components of the plurality of components; determine a sensed temperature for individual components of the plurality of components; and control a coolant flow rate from the inlet manifold to individual components of the plurality of components based on the sensed temperature of the corresponding component and the target temperature of the corresponding component.

Example 3 includes the subject matter of any of Examples 1 and 2, and wherein to control the coolant flow comprises determine that a first component of the plurality of components has a sensed temperature below a target temperature of the first component; determine that a second component of the plurality of components has a sensed temperature above the target temperature of the second component; reduce coolant flow to the first component in response to a determination that the first component has a sensed temperature below the target temperature of the first component and a determination that the second component has a sensed temperature above the target temperature of the second component; and increase coolant flow to the first component in response to a determination that the first component has a sensed temperature below the target temperature of the first component and a determination that the second component has a sensed temperature above the target temperature of the second component.

Example 4 includes the subject matter of any of Examples 1-3, and wherein the first component is a component of a first compute device in a first rack, and the second component is a component of a second compute device different from the first compute device, the second compute device in a second rack different from the first rack.

Example 5 includes the subject matter of any of Examples 1-4, and wherein the controller device is to monitor one or more performance parameters of individual heat exchangers of the plurality of heat exchangers; determine, based on the one or more performance parameters of individual heat exchangers of the plurality of heat exchangers, that a heat exchanger of the plurality of heat exchangers is faulty; close, in response to a determination that the heat exchanger is faulty, a valve controlling coolant flow through the faulty heat exchanger; and open, in response to the determination that the heat exchanger is faulty, a valve controlling coolant flow through a standby heat exchanger of the plurality of heat exchangers.

Example 6 includes the subject matter of any of Examples 1-5, and wherein the controller device is further to notify an administrator that the faulty heat exchanger is faulty.

Example 7 includes the subject matter of any of Examples 1-6, and wherein to determine that the heat exchanger is faulty comprises to compare an inlet temperature of the heat exchanger to an outlet temperature of the heat exchanger.

Example 8 includes the subject matter of any of Examples 1-7, and wherein to determine that the heat exchanger is faulty comprises to compare an air exhaust temperature at individual fans of a plurality of fans of the heat exchanger.

Example 9 includes the subject matter of any of Examples 1-8, and wherein the plurality of heat exchangers comprises one or more open heat exchangers and one or more closed heat exchangers, wherein the controller device is to determine a target temperature for individual components of the plurality of components; determine a sensed temperature for individual components of the plurality of components; determine that a heat exchanger of the closed heat exchangers is to be opened based on the target temperature of the plurality of components and the sensed temperature of the plurality of components; and open a valve on one of the plurality of heat exchangers in response to the determination that a heat exchanger of the closed heat exchangers is to be opened.

Example 10 includes the subject matter of any of Examples 1-9, and wherein the controller device is to receive workload information for the one or more compute devices; and control the plurality of component valves and the plurality of heat exchanger valves based on the workload information.

Example 11 includes the subject matter of any of Examples 1-10, and wherein the workload information comprises a power used by individual components of the plurality of components.

Example 12 includes the subject matter of any of Examples 1-11, and wherein to control the plurality of component valves and the plurality of heat exchanger valves based on the workload information the workload information comprises to access a database based on the workload information, wherein the database comprises cooling parameters associated with a past workload with past workload information similar to the workload information.

Example 13 includes the subject matter of any of Examples 1-12, and wherein the controller device is to store in a database an indication of current workload information and current cooling parameters.

Example 14 includes a controller device comprising a processor; a memory communicatively coupled to the processor; one or more storage devices comprising a plurality of instructions stored thereon that, when executed by the processor, causes the controller device to determine a target temperature for individual components of a plurality of components of one or more compute devices; determine a sensed temperature for individual components of the plurality of components; and control a coolant flow rate from an inlet manifold to individual components of the plurality of components based on the sensed temperature of the corresponding component and the target temperature of the corresponding component.

Example 15 includes the subject matter of Example 14, and wherein to control the coolant flow comprises determine that a first component of the plurality of components has a sensed temperature below the target temperature of the first component; determine that a second component of the plurality of components has a sensed temperature above the target temperature of the second component; reduce coolant flow to the first component in response to a determination that the first component has a sensed temperature below the target temperature of the first component and a determination that the second component has a sensed temperature above the target temperature of the second component; and increase coolant flow to the first component in response to a determination that the first component has a sensed temperature below the target temperature of the first component and a determination that the second component has a sensed temperature above the target temperature of the second component.

Example 16 includes the subject matter of any of Examples 14 and 15, and wherein the plurality of instructions further cause the controller device to monitor one or more performance parameters of individual heat exchangers of a plurality of heat exchangers connected to the inlet manifold; determine, based on the one or more performance parameters of individual heat exchangers of the plurality of heat exchangers, that a heat exchanger of the plurality of heat exchangers is faulty; close, in response to a determination that the heat exchanger is faulty, a valve controlling coolant flow through the faulty heat exchanger; and open, in response to the determination that the heat exchanger is faulty, a valve controlling coolant flow through a standby heat exchanger of the plurality of heat exchangers.

Example 17 includes the subject matter of any of Examples 14-16, and wherein the plurality of instructions further cause the controller device to notify an administrator that the faulty heat exchanger is faulty.

Example 18 includes the subject matter of any of Examples 14-17, and wherein to determine that the heat exchanger is faulty comprises to compare an inlet temperature of the heat exchanger to an outlet temperature of the heat exchanger.

Example 19 includes the subject matter of any of Examples 14-18, and wherein to determine that the heat exchanger is faulty comprises to compare an air exhaust temperature at individual fans of a plurality of fans of the heat exchanger.

Example 20 includes the subject matter of any of Examples 14-19, and wherein the manifold is connected to a plurality of heat exchangers that comprises one or more open heat exchangers and one or more closed heat exchangers, wherein the plurality of instructions further cause the controller device to determine a target temperature for individual components of the plurality of components; determine a sensed temperature for individual components of the plurality of components; determine that a heat exchanger of the closed heat exchangers is to be opened based on the target temperature of the plurality of components and the sensed temperature of the plurality of components; and open a valve on one of the plurality of heat exchangers in response to the determination that a heat exchanger of the closed heat exchangers is to be opened.

Example 21 includes the subject matter of any of Examples 14-20, and wherein the plurality of instructions further cause the controller device to receive workload information for the one or more compute devices; and control a coolant flow rate from the inlet manifold to individual components of the plurality of components based on the workload information.

Example 22 includes the subject matter of any of Examples 14-21, and wherein the workload information comprises a power used by individual components of the plurality of components.

Example 23 includes the subject matter of any of Examples 14-22, and wherein to control a coolant flow rate from the inlet manifold to individual components of the plurality of components based on the workload information comprises to access a database based on the workload information, wherein the database comprises cooling parameters associated with a past workload with past workload information similar to the workload information.

Example 24 includes the subject matter of any of Examples 14-23, and wherein the plurality of instructions further cause the controller device to store in a database an indication of current workload information and current cooling parameters.

Example 25 includes one or more machine-readable media comprising a plurality of instructions stored thereon that, when executed by a controller device, causes the controller device to determine a target temperature for individual components of a plurality of components of one or more compute devices; determine a sensed temperature for individual components of the plurality of components; and control a coolant flow rate from an inlet manifold to individual components of the plurality of components based on the sensed temperature of the corresponding component and the target temperature of the corresponding component.

Example 26 includes the subject matter of Example 25, and wherein to control the coolant flow comprises determine that a first component of the plurality of components has a sensed temperature below the target temperature of the first component; determine that a second component of the plurality of components has a sensed temperature above the target temperature of the second component; reduce coolant flow to the first component in response to a determination that the first component has a sensed temperature below the target temperature of the first component and a determination that the second component has a sensed temperature above the target temperature of the second component; and increase coolant flow to the first component in response to a determination that the first component has a sensed temperature below the target temperature of the first component and a determination that the second component has a sensed temperature above the target temperature of the second component.

Example 27 includes the subject matter of any of Examples 25 and 26, and wherein the plurality of instructions further cause the controller device to monitor one or more performance parameters of individual heat exchangers of a plurality of heat exchangers connected to the inlet manifold; determine, based on the one or more performance parameters of individual heat exchangers of the plurality of heat exchangers, that a heat exchanger of the plurality of heat exchangers is faulty; close, in response to a determination that the heat exchanger is faulty, a valve controlling coolant flow through the faulty heat exchanger; and open, in response to the determination that the heat exchanger is faulty, a valve controlling coolant flow through a standby heat exchanger of the plurality of heat exchangers.

Example 28 includes the subject matter of any of Examples 25-27, and wherein the plurality of instructions further cause the controller device to notify an administrator that the faulty heat exchanger is faulty.

Example 29 includes the subject matter of any of Examples 25-28, and wherein to determine that the heat exchanger is faulty comprises to compare an inlet temperature of the heat exchanger to an outlet temperature of the heat exchanger.

Example 30 includes the subject matter of any of Examples 25-29, and wherein to determine that the heat exchanger is faulty comprises to compare an air exhaust temperature at individual fans of a plurality of fans of the heat exchanger.

Example 31 includes the subject matter of any of Examples 25-30, and wherein the manifold is connected to a plurality of heat exchangers that comprises one or more open heat exchangers and one or more closed heat exchangers, wherein the plurality of instructions further cause the controller device to determine a target temperature for individual components of the plurality of components; determine a sensed temperature for individual components of the plurality of components; determine that a heat exchanger of the closed heat exchangers is to be opened based on the target temperature of the plurality of components and the sensed temperature of the plurality of components; and open a valve on one of the plurality of heat exchangers in response to the determination that a heat exchanger of the closed heat exchangers is to be opened.

Example 32 includes the subject matter of any of Examples 25-31, and wherein the plurality of instructions further cause the controller device to receive workload information for the one or more compute devices; and control a coolant flow rate from the inlet manifold to individual components of the plurality of components based on the workload information.

Example 33 includes the subject matter of any of Examples 25-32, and wherein the workload information comprises a power used by individual components of the plurality of components.

Example 34 includes the subject matter of any of Examples 25-33, and wherein to control a coolant flow rate from the inlet manifold to individual components of the plurality of components based on the workload information comprises to access a database based on the workload information, wherein the database comprises cooling parameters associated with a past workload with past workload information similar to the workload information.

Example 35 includes the subject matter of any of Examples 25-34, and wherein the plurality of instructions further cause the controller device to store in a database an indication of current workload information and current cooling parameters.

Example 36 includes a controller device comprising means for determining a target temperature for individual components of a plurality of components of one or more compute devices of a system, the system comprising the plurality of components, an inlet manifold, an outlet manifold, and one or more heat exchangers; means for determining a sensed temperature for individual components of the plurality of components; and means for controlling a coolant flow rate from the inlet manifold to individual components of the plurality of components based on the sensed temperature of the corresponding component and the target temperature of the corresponding component.

Example 37 includes the subject matter of Example 36, and wherein the one or more heat exchanger comprises one or more open heat exchangers and one or more closed heat exchangers, the controller device further comprising means for determining a sensed temperature for individual components of the plurality of components; means for determining that a heat exchanger of the one or more closed heat exchangers is to be opened based on the target temperature of the plurality of components and the sensed temperature of the plurality of components; means for opening a valve on one of the one or more heat exchangers in response to the determination that a heat exchanger of the closed heat exchangers is to be opened.

Example 38 includes the subject matter of any of Examples 36 and 37, and further including means for monitoring one or more performance parameters of individual heat exchangers of the one or more heat exchangers, wherein individual heat exchangers of the one or more heat exchangers are connected to the inlet manifold and the outlet manifold; means for determining, based on the one or more performance parameters of individual heat exchangers of the plurality of heat exchangers, that a heat exchanger of the plurality of heat exchangers is faulty; means for closing, in response to a determination that the heat exchanger is faulty, a valve controlling coolant flow through the faulty heat exchanger; and means for opening, in response to the determination that the heat exchanger is faulty, a valve controlling coolant flow through a standby heat exchanger of the plurality of heat exchangers.

Example 39 includes the subject matter of any of Examples 36-38, and further including means for alerting an administrator that the faulty heat exchanger is faulty; replacing, by the administrator and while individual heat exchangers of one or more plurality of heat exchangers other than the faulty heat exchanger are receiving coolant from the outlet manifold, the faulty heat exchanger.

Example 40 includes a method comprising determining, by a controller device, a target temperature for individual components of a plurality of components of one or more compute devices of a system, the system comprising the plurality of components, an inlet manifold, an outlet manifold, and one or more heat exchangers; determining, by the controller device, a sensed temperature for individual components of the plurality of components; and controlling, by the controller device, a coolant flow rate from the inlet manifold to individual components of the plurality of components based on the sensed temperature of the corresponding component and the target temperature of the corresponding component.

Example 41 includes the subject matter of Example 40, and wherein the one or more heat exchanger comprises one or more open heat exchangers and one or more closed heat exchangers, the method further comprising determining, by the controller device, a sensed temperature for individual components of the plurality of components; determining, by the controller device, that a heat exchanger of the one or more closed heat exchangers is to be opened based on the target temperature of the plurality of components and the sensed temperature of the plurality of components; opening, by the controller device, a valve on one of the one or more closed heat exchangers in response to the determination that a heat exchanger of the one or more closed heat exchangers is to be opened.

Example 42 includes the subject matter of any of Examples 40 and 41, and further including monitoring, by a controller device, one or more performance parameters of individual heat exchangers of the one or more heat exchangers, wherein individual heat exchangers of the one or more heat exchangers are connected to the inlet manifold and the outlet manifold; determining, by the controller device and based on the one or more performance parameters of individual heat exchangers of the one or more heat exchangers, that a heat exchanger of the one or more heat exchangers is faulty; closing, by the controller device and in response to a determination that the heat exchanger is faulty, a valve controlling coolant flow through the faulty heat exchanger; and opening, by the controller device and in response to the determination that the heat exchanger is faulty, a valve controlling coolant flow through a standby heat exchanger of the plurality of heat exchangers.

Example 43 includes the subject matter of any of Examples 40-42, and further including alerting, by the controller device, an administrator that the faulty heat exchanger is faulty; replacing, by the administrator and while individual heat exchangers of the one or more heat exchangers other than the faulty heat exchanger are receiving coolant from the outlet manifold, the faulty heat exchanger.

Example 44 includes a controller device comprising a processor; a memory communicatively coupled to the processor; one or more storage devices comprising a plurality of instructions stored thereon that, when executed by the processor, causes the controller device to determine a target temperature for individual components of a plurality of components of one or more compute devices of a system, the system comprising the plurality of components, an inlet manifold, an outlet manifold, and a plurality of heat exchangers, wherein the plurality of heat exchangers comprises one or more open heat exchangers and one or more closed heat exchangers; determine a sensed temperature for individual components of the plurality of components; determine that a heat exchanger of the closed heat exchangers is to be opened based on the target temperature of the plurality of components and the sensed temperature of the plurality of components; opening a valve on one of the one or more closed heat exchangers in response to the determination that a heat exchanger of the closed heat exchangers is to be opened.

Example 45 includes a controller device comprising a processor; a memory communicatively coupled to the processor; one or more storage devices comprising a plurality of instructions stored thereon that, when executed by the processor, causes the controller device to monitor one or more performance parameters of individual heat exchangers of a plurality of heat exchangers, wherein individual heat exchangers of the plurality of heat exchangers are connected to a manifold; determine, based on the one or more performance parameters of individual heat exchangers of the plurality of heat exchangers, that a heat exchanger of the plurality of heat exchangers is faulty; close, in response to a determination that the heat exchanger is faulty, a valve controlling coolant flow through the faulty heat exchanger; and open, in response to the determination that the heat exchanger is faulty, a valve controlling coolant flow through a standby or backup heat exchanger of the plurality of heat exchangers.

The invention claimed is:

1. A system comprising:
   a plurality of components of one or more compute devices;
   a plurality of heat exchangers, wherein the plurality of heat exchangers comprises a backup heat exchanger;
   an inlet manifold connected to individual components of the plurality of components and individual heat exchangers of the plurality of heat exchangers, the inlet manifold to carry liquid coolant from the plurality of heat exchangers to the plurality of components;
   an outlet manifold connected to individual components of the plurality of components and individual heat exchangers of the plurality of heat exchangers, the outlet manifold to carry liquid coolant from the plurality of components to the plurality of heat exchangers;
   a plurality of component valves, wherein individual component valves of the plurality of component valves control flow of liquid coolant to a corresponding component of the plurality of components;
   a plurality of heat exchanger valves, wherein individual heat exchanger valves of the plurality of heat exchanger valves control flow of liquid coolant to a corresponding heat exchanger of the plurality of heat exchangers; and
   a controller device configured to:
      control the plurality of component valves and the plurality of heat exchanger valves;
      monitor one or more parameters of the plurality of heat exchangers;
      determine, based on the one or more parameters of the plurality of heat exchangers, that a heat exchanger of the plurality of heat exchangers is faulty;
      close, in response to a determination that the heat exchanger is faulty, a valve controlling coolant flow through the faulty heat exchanger; and
      open, in response to the determination that the heat exchanger is faulty, a valve controlling coolant flow through the backup heat exchanger of the plurality of heat exchangers.

2. The system of claim 1, wherein the controller device is configured to:
   determine a target temperature for individual components of the plurality of components;
   determine a sensed temperature for individual components of the plurality of components; and
   control a coolant flow rate from the inlet manifold to individual components of the plurality of components based on the sensed temperature of the corresponding component and the target temperature of the corresponding component.

3. The system of claim 2, wherein to control the coolant flow rate comprises:
   determine that a first component of the plurality of components has a sensed temperature below a target temperature of the first component;
   determine that a second component of the plurality of components has a sensed temperature above the target temperature of the second component;
   reduce coolant flow to the first component in response to a determination that the first component has a sensed temperature below the target temperature of the first component and a determination that the second component has a sensed temperature above the target temperature of the second component; and
   increase coolant flow to the second component in response to a determination that the first component has a sensed temperature below the target temperature of the first component and a determination that the second component has a sensed temperature above the target temperature of the second component.

4. The system of claim 1, wherein the controller device is further configured to notify an administrator that the faulty heat exchanger is faulty.

5. The system of claim 1, wherein to determine that the heat exchanger is faulty comprises to compare an inlet temperature of the heat exchanger to an outlet temperature of the heat exchanger.

6. The system of claim 1, where to determine that the heat exchanger is faulty comprises to compare an air exhaust temperature at individual fans of a plurality of fans of the heat exchanger.

7. The system of claim 1,
wherein the controller device is configured to:
determine a target temperature for individual components of the plurality of components;
determine a sensed temperature for individual components of the plurality of components;
determine that a closed heat exchanger of the plurality of heat exchangers is to be opened based on the target temperature of the plurality of components and the sensed temperature of the plurality of components; and
open a heat exchanger valve of the plurality of heat exchanger valves in response to the determination that the closed heat exchanger of the plurality of heat exchangers is to be opened.

8. The system of claim 1, wherein the controller device is configured to:
receive workload information for the one or more compute devices; and
control the plurality of component valves and the plurality of heat exchanger valves based on the workload information.

9. The system of claim 8, wherein the workload information comprises a power used by individual components of the plurality of components.

10. The system of claim 8, wherein to control the plurality of component valves and the plurality of heat exchanger valves based on the workload information the workload information comprises to access a database based on the workload information, wherein the database comprises cooling parameters associated with a past workload with past workload information.

11. The system of claim 8, wherein the controller device is configured to:
store in a database an indication of current workload information and current cooling parameters.

12. A controller device comprising:
a processor;
a memory communicatively coupled to the processor; and
one or more storage devices comprising a plurality of instructions stored thereon that, when executed by the processor, causes the controller device to:
determine a target temperature for individual components of a plurality of components of one or more compute devices;
determine a sensed temperature for individual components of the plurality of components;
control a coolant flow rate from an inlet manifold to individual components of the plurality of components based on the sensed temperature of the corresponding component and the target temperature of the corresponding component;
monitor one or more parameters of a plurality of heat exchangers connected to the inlet manifold, the plurality of heat exchangers comprising a backup heat exchanger;
determine, based on the one or more parameters of the plurality of heat exchangers, that a heat exchanger of the plurality of heat exchangers is faulty;
close, in response to a determination that the heat exchanger is faulty, a valve controlling coolant flow through the faulty heat exchanger; and
open, in response to the determination that the heat exchanger is faulty, a valve controlling coolant flow through the backup heat exchanger of the plurality of heat exchangers.

13. The controller device of claim 12, wherein to control the coolant flow comprises:
determine that a first component of the plurality of components has a sensed temperature below the target temperature of the first component;
determine that a second component of the plurality of components has a sensed temperature above the target temperature of the second component;
reduce coolant flow to the first component in response to a determination that the first component has a sensed temperature below the target temperature of the first component and a determination that the second component has a sensed temperature above the target temperature of the second component; and
increase coolant flow to the second component in response to a determination that the first component has a sensed temperature below the target temperature of the first component and a determination that the second component has a sensed temperature above the target temperature of the second component.

14. The controller device of claim 12, wherein the plurality of instructions further cause the controller device to notify an administrator that the faulty heat exchanger is faulty.

15. The controller device of claim 12, wherein to determine that the heat exchanger is faulty comprises to compare an inlet temperature of the heat exchanger to an outlet temperature of the heat exchanger.

16. The controller device of claim 12, where to determine that the heat exchanger is faulty comprises to compare an air exhaust temperature at individual fans of a plurality of fans of the heat exchanger.

17. The controller device of claim 12,
wherein the plurality of instructions further cause the controller device to:
determine a target temperature for individual components of the plurality of components;
determine a sensed temperature for individual components of the plurality of components;
determine that a closed heat exchanger of the plurality of heat exchangers is to be opened based on the target temperature of the plurality of components and the sensed temperature of the plurality of components; and
open a valve on the closed heat exchanger in response to the determination that the closed heat exchanger is to be opened.

18. The controller device of claim 12, wherein the plurality of instructions further cause the controller device to:
receive workload information for the one or more compute devices; and
control a coolant flow rate from the inlet manifold to individual components of the plurality of components based on the workload information.

19. The controller device of claim 18, wherein the workload information comprises a power used by individual components of the plurality of components.

20. A method comprising:
determining, by a controller device, a target temperature for individual components of a plurality of components of one or more compute devices of a system, the system comprising the plurality of components, an inlet manifold, an outlet manifold, and a plurality of heat exchangers, wherein the controller device comprises a processor, a memory communicatively coupled to the processor, and one or more storage devices, wherein the plurality of heat exchangers comprises a backup heat exchanger;

determining, by the controller device, a sensed temperature for individual components of the plurality of components;

controlling, by the controller device, a coolant flow rate from the inlet manifold to individual components of the plurality of components based on the sensed temperature of the corresponding component and the target temperature of the corresponding component;

monitoring, by the controller device, one or more parameters of the plurality of heat exchangers, wherein individual heat exchangers of the plurality of heat exchangers are connected to the inlet manifold and the outlet manifold;

determining, by the controller device and based on the one or more parameters of the plurality of heat exchangers, that a heat exchanger of the plurality of heat exchangers is faulty;

closing, by the controller device and in response to a determination that the heat exchanger is faulty, a valve controlling coolant flow through the faulty heat exchanger; and opening, by the controller device and in response to the determination that the heat exchanger is faulty, a valve controlling coolant flow through the backup heat exchanger.

21. The method of claim 20, wherein the plurality of heat exchangers comprises one or more open heat exchangers and one or more closed heat exchangers, the method further comprising:

determining, by the controller device, a sensed temperature for individual components of the plurality of components;

determining, by the controller device, that a heat exchanger of the one or more closed heat exchangers is to be opened based on the target temperature of the plurality of components and the sensed temperature of the plurality of components; and opening a valve on one of the one or more closed heat exchangers in response to the determination that a heat exchanger of the one or more closed heat exchangers is to be opened.

22. The method of claim 20, further comprising:

alerting, by the controller device, an administrator that the faulty heat exchanger is faulty; replacing, by the administrator and while individual heat exchangers of the one or more heat exchangers other than the faulty heat exchanger are receiving coolant from the outlet manifold, the faulty heat exchanger.

* * * * *